United States Patent
Cigolini

(10) Patent No.: US 7,275,386 B2
(45) Date of Patent: Oct. 2, 2007

(54) MACHINE FOR THE PROCESSING OF FOODS, IN PARTICULAR AN ICE CREAM MACHINE

(75) Inventor: Aldo Cigolini, Retegno di Fombia (IT)

(73) Assignee: Telme S.p.A., Lodi (IT)

( * ) Notice: Subject to any disclaimer, the term of this patent is extended or adjusted under 35 U.S.C. 154(b) by 1031 days.

(21) Appl. No.: 10/288,779

(22) Filed: Nov. 6, 2002

(65) Prior Publication Data
US 2003/0161924 A1    Aug. 28, 2003

(30) Foreign Application Priority Data
Nov. 8, 2001   (IT)   .......................... MI20010584 U
Aug. 14, 2002  (EP)  ................................ 02018342

(51) Int. Cl.
    *A23G 9/12*    (2006.01)
(52) U.S. Cl. .......................................... 62/342; 62/524
(58) Field of Classification Search .......... 62/342–343, 62/199–200, 524–525
    See application file for complete search history.

(56) References Cited

U.S. PATENT DOCUMENTS 3,866,439 A * 2/1975 Bussjager et al. ............ 62/504
4,040,268 A * 8/1977 Howard ........................ 62/335
4,201,065 A * 5/1980 Griffin ........................... 62/510
4,703,628 A * 11/1987 Togashi et al. ............... 62/135
5,927,098 A    7/1999 Lee

FOREIGN PATENT DOCUMENTS

| FR | 2542578 | 9/1984 |
| GB | 1 313 719 | 4/1973 |
| GB | 2 146 108 | 4/1985 |
| WO | WO 03/068029 | 8/2003 |

* cited by examiner

*Primary Examiner*—William E. Tapolcai
(74) *Attorney, Agent, or Firm*—Eugene C. Rzucidlo; Hunton & Williams LLP

(57) ABSTRACT

A machine for the processing of foods while refrigerating the same at least at times, in particular an ice cream machine, comprising a container (11) to receive the starting substances and a refrigerating device, including a refrigerating circuit (21) with a compressor (23) and an evaporator (19), in particular in the form of a refrigerating coil wound around the container 11, coming into thermal contact with the foods at least indirectly, wherein to reduce the energy requirement and to improve the quality of the processed foods at least one second refrigerating circuit (22) with an evaporator (20) coming into thermal contact with the foods present in the container is provided and optionally both or all refrigerating circuits can be used or only one or fewer than all refrigerating circuits can be used.

9 Claims, 1 Drawing Sheet

MACHINE FOR THE PROCESSING OF FOODS, IN PARTICULAR AN ICE CREAM MACHINE

Figure 1:
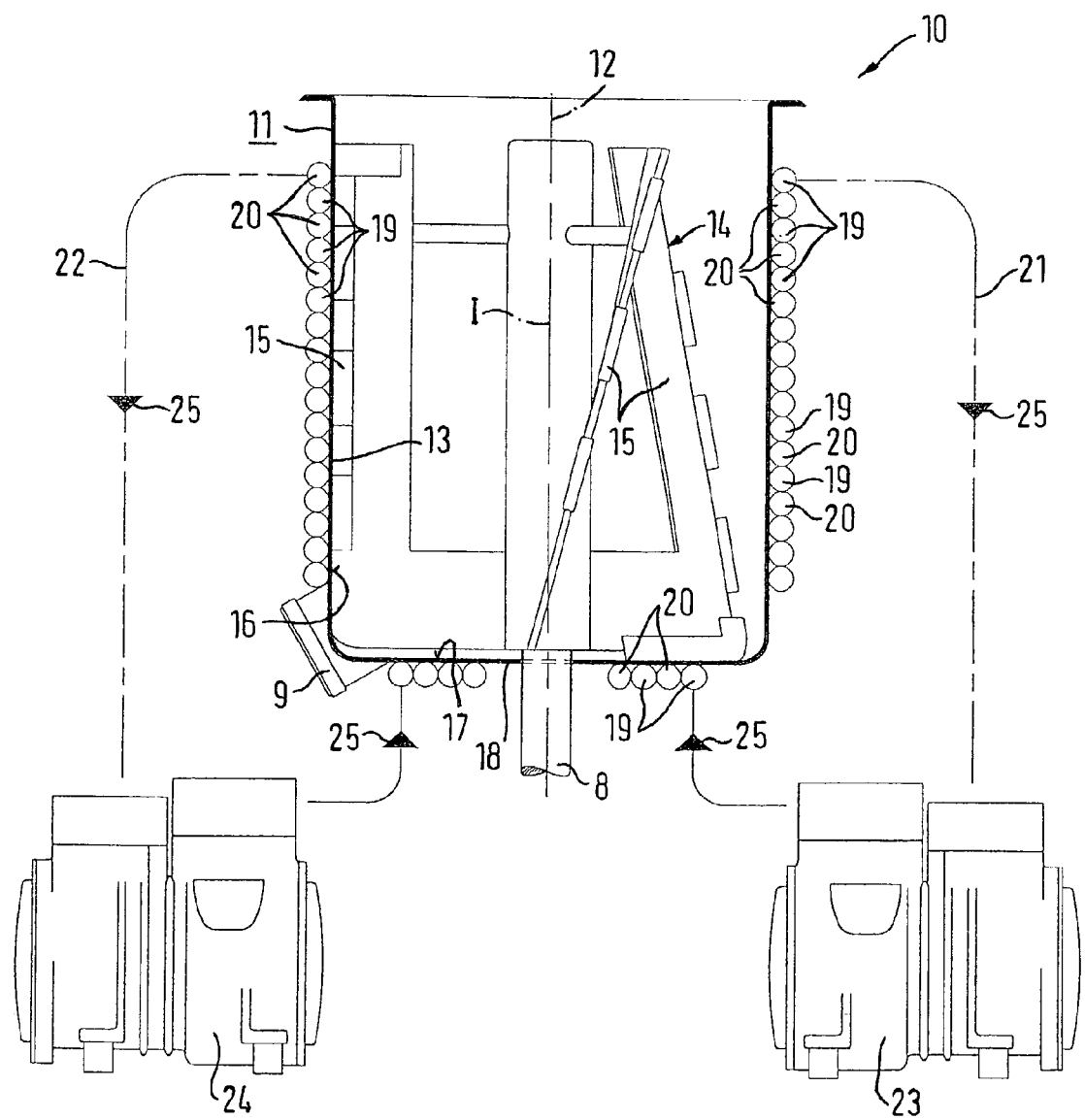

The present invention relates to a machine for the processing of foods while refrigerating the same at least at times, in particular to an ice cream machine, comprising a container to receive the starting substances and a refrigerating device, comprising a refrigerating circuit having a compressor and an evaporator, in particular in the form of at least one refrigerating coil wound around the container, coming into thermal contact with the foods at least indirectly.

Machines of this kind designed as ice cream machines normally have a cylindrical container which is in particular formed of stainless steel and in which a stirrer is arranged whose stirrer blades are in scraping engagement with the inner wall of the cylinder. The cylinder axis and the rotational axis of the stirrer can be arranged horizontally or vertically. To achieve the refrigerating of the mass present in the container required for the preparation of ice cream, known ice cream machines of this kind have a refrigerating circuit comprising a compressor and an evaporator made as a refrigerating coil, with the refrigerating coil being arranged around the jacket of the cylinder and possibly also on the cylinder head.

To ensure a sufficiently rapid refrigeration even with a maximum filling of the container, the refrigerating power of the refrigerating device must be selected to be sufficiently large. This results in a correspondingly large energy consumption which is also present even with a filling which is not maximum. Machines with different volumes and different refrigerating powers are therefore usually made available. However, even with these, different amounts are frequently produced depending on the sort and the season of production. As is known, vanilla ice cream is, for example, always required in greater amounts than other sorts and in summer all sorts are needed more than in the pre-season, the post-season or in winter.

It is the underlying object of the invention to improve machines of the kind initially named. In particular, a more efficient utilization of energy should be made possible.

This object is satisfied in that at least one second refrigerating circuit is provided comprising an evaporator coming into thermal contact with the foods and in that, optionally, both or all refrigerating circuits or only one or fewer than all refrigerating circuits can be used.

By the provision of at least one further refrigerating circuit and of the possibility of optionally using only one or both or all refrigerating circuits, a more efficient utilization of energy can be achieved. In particular, only one refrigerating circuit can be used with a non-maximum filling or with a desired longer treatment time, while both or all refrigerating circuits, and thus the full refrigerating power, only have to be used for an actual requirement, with it having been found that the required processing time does not double when only one of two refrigerating circuits is used, that is with the use of only half the power, but only increases by 40 to 50%. A further advantage consists of the fact that with cold-sensitive product, work can be carried out with a reduced cold power by switching on only one refrigerating circuit and the product can thus be spared.

The refrigerating circuits can be connected to one another and only have one common compressor in that the two part circuits having the evaporator are each made to be switched off. It is, however, preferred for the refrigerating circuits to be separate from one another and to each have their own compressor. This allows the use of compressors with lower power such that only one compressor is in operation when a refrigerating circuit is switched off. The energy saving can thereby be further increased.

The compressors of the refrigerating circuits can have the same or different powers among one another. With a different power, an even better matching to the actually required refrigerating power can be achieved, and thus the energy utilization can be further improved, by a corresponding selection of the one, the other or both refrigerating circuits.

It is preferred in all cases for the sum of the powers of both or all compressors to be smaller than the power of the one compressor of a conventional machine of the same capacity. It has namely been found that despite the lower overall power of the compressors, the same result can be achieved in the same time. A clear energy saving can thus be achieved in this manner.

The container can, for example, have a maximum filling amount of approximately 18 to approximately 20 liters. For such a container, preferably two compressors can be provided which can optionally be switched on and have a power from approximately 2 kW to 2.5 kW. Such a design has been found to be advantageous.

The evaporator of the refrigerating circuits, in particular the refrigerating coils, are preferably arranged parallel to one another. It can thus be ensured that both evaporators can equally come into thermal contact with the substances to be treated.

The refrigerating coils are particularly preferably arranged around the container such that the turns of the respective refrigerating coils alternate among one another. It can thus be ensured that substantially the whole container surface is refrigerated independently of the refrigerating coils used in the individual case.

In accordance with a preferred embodiment of the invention, the refrigerating coils are arranged on the outside of the container, in particular on its jacket and base area, and a stirrer is provided at the interior of the container whose stirrer blades are in particular in scraping engagement with the inner wall of the container. Such a design is in particular suitable for the manufacture of ice cream and has been found to be particularly advantageous.

In accordance with a further embodiment of the invention, the container has a delivery opening and/or a discharge opening in the region of its base, in particular in the transition region between the base and the side wall. The removal of the finished product can thereby be facilitated. In addition, cleaning liquid and the like can be discharged through this opening.

It is particularly preferred in this connection for the direction of rotation of the stirrer to be reversible for the delivery of the finished product. The delivery can thereby be accelerated. In addition, a largely complete emptying of the container is thereby achieved.

The stirrer can have a horizontal axis of rotation. It is, however, preferred for the stirrer to have a vertical axis of rotation. A simple design of the machine can thus be achieved. In addition, the filling of the machine is facilitated.

The length of time of a respective treatment cycle can be controllable via the time procedure and/or the temperature and/or the consistency, that is via the resistance on the stirring of the end product. The one or the other solution is advantageous depending on the application.

An embodiment of the invention is represented in the drawing and will be described in the following. It shows as the only FIGURE in a schematic representation FIG. 1 a cross-section through a part of an ice cream machine in accordance with the invention having two compressors and indicated refrigerating circuits.

The ice cream machine 10 shown includes a container 11 with a vertical container axis 12 and a stirrer 14 with stirring blades 15 arranged in the container 11, said stirring blades 15 being in scraping engagement with the inner side 16 of the side wall 13 of the container 11 and with the inner side 17 of its base 18. The axis of rotation I of the stirrer 14 coincides with the axis of the container 12. The stirrer 14 can be driven about its axis I via a drive motor (not shown) and a shaft 8, with the axis of rotation preferably being made reversible.

Refrigerating coils 19, 20 are respectively arranged on the outer side of the container side wall 13 and of the container base 18, with the refrigerating coils 19 and 20 being arranged around the side wall 13 of the container 11 such that the turns of the refrigerating coils 19 alternate with the turns of the refrigerating coil 20. The same applies to the turns of the refrigerating coils 19 and 20 on the outer side of the base 18 of the container 11.

The refrigerating coil 19 is connected to a first refrigerating circuit 21 and the refrigerating coil 20 to a second refrigerating circuit 22. Both refrigerating circuits 21 and 22 are completely separate from one another and each have their own compressor 23, 24, with the compressors being able to have the same or different powers. The direction of flow of the refrigerant through the refrigerating circuits 21 and 22 is indicated in each case with arrows 25.

In the transition region between the base 18 and the side wall 13 of the container 11, the latter has a delivery and discharge opening 9 which is closable via means not shown here. The upper end of the container 11 is moreover closable by a cover which is likewise not shown here and is preferably transparent.

For the operation of the ice cream machine in accordance with the invention, the container 11 is first filled with the ingredients of the ice cream to be produced. Furthermore, the stirrer 14 is set in motion and one of the two refrigerating circuits 21, 22, or both refrigerating circuits 21 and 22, are activated in that one or both compressors 23, 24 are switched on. In particular with a low filling of the container 11 or with a desired longer treatment period or with cold sensitive ingredients, only one of the two refrigerating circuits 21, 22 is activated, while in particular with a full filling of the container 11 or for the shortest possible treatment period, both refrigerating circuits 21, 22 are activated. The energy consumption can thereby be matched to the respective actual requirement.

After completion of the final product, the refrigerating circuits 21, 22 are switched off and the ice cream is delivered via the opening 9. The direction of rotation of the stirrer 14 is in particular reversed for this purpose so that the ice cream is ejected through the opening 9 with a high force.

The ice cream machine in accordance with the invention thus has the advantage that it can be better matched to the respective requirement than known machines. In particular, the energy consumption can be reduced in that with a lower refrigerating power requirement, only one compressor 23 or 24 is switched on and both compressors 23 and 24 only with a high required refrigerating power. In addition to the reduction of the energy consumption, a possible cold sensitivity of ingredients can also thereby be taken into account in that a slower refrigeration takes place by only one compressor 23 or 24.

REFERENCE NUMERAL LIST 8 shaft
9 delivery opening
10 ice cream machine
11 container
12 container axis
13 container side wall
14 stirrer
15 scraper blade
16 inner side of the container side wall
17 inner side of the container base
18 container base
19 first refrigerating coil
20 second refrigerating coil
21 first refrigerating circuit
22 second refrigerating circuit
23 first compressor
24 second compressor
25 arrow
I axis of rotation of the stirrer

The invention claimed is:

1. A machine for the processing of foods while refrigerating the same at least at times, comprising a container to receive starting substance or substances and a refrigerating device, including a refrigerating circuit with a compressor and an evaporator being in the form of a refrigerating coil wound around the container 11 and coming into thermal contact with the foods at least indirectly, wherein at least one second refrigerating circuit with an evaporator coming into thermal contact with the foods present in the container and being in the form of a refrigerating coil is provided, the refrigerating coils being arranged parallel to one another around the container such that the turns of the respective refrigerating coils alternate among one another; and wherein optionally both or all refrigerating circuits can be used or only one or fewer than all refrigerating circuits can be used.

2. A machine in accordance with claim 1, wherein the refrigerating circuits are separate from one another and each have their own compressor, with the compressors having the same or a different power.

3. A machine in accordance with claim 1, wherein the sum of the powers of the two or of all compressors is smaller than the power of the one compressor of a conventional machine of the same capacity.

4. A machine in accordance with claim 1, wherein the refrigerating coils are arranged on the outer side of the side wall and on the outer side of the base or on the end wall, with a horizontal arrangement; and in that a stirrer is provided at the interior of the container whose stirrer blades are in scraping engagement with the inner wall of the container.

5. A machine in accordance with claim 1, wherein the container has a delivery opening and/or a discharge opening in the transition region between the base and the side wall.

6. A machine in accordance with claim 4, wherein the direction of rotation of the stirrer is reversible to deliver the finished product.

7. A machine in accordance with claim 4, wherein the stirrer has a vertical axis of rotation.

8. A machine in accordance with claim 1, wherein the processing time is controllable over a time procedure and/or a temperature and/or a consistency of the treated product.

9. A machine according to claim 1, wherein the machine is an ice cream machine.

* * * * *